Patented July 19, 1938

2,124,371

UNITED STATES PATENT OFFICE 2,124,371

METHODS OF PRODUCING PHOTOGRAPHIC IMAGE CARRIERS PROVIDED WITH PRECIPITANTS FOR COLORING DYES

Richard Gschöpf and Karl Pokorny, Vienna, Austria; said Pokorny assignor to said Gschöpf No Drawing. Original application January 10, 1934, Serial No. 706,128. Divided and this application October 30, 1934, Serial No. 750,688. In Austria July 22, 1933

2 Claims. (Cl. 101—149)

This invention relates to the production of photographic image carriers provided with precipitants for coloring dyes. In order to obtain well defined and correctly colored photographic pictures, it is necessary to precipitate the coloring matter passing over from the matrices (washed out reliefs) on to the carriers, as rapidly and completely as possible, in the form of insoluble lac.

The patents owned by the Hess Ives Co. (such as the Austrian Patent No. 74,223 dating from the year 1918) deal in general with the precipitating of all kinds of dyes (acid and basic) in the form of insoluble lacs. In particular, there is there disclosed the use of chromium compounds for acid coloring matter (alizerine dyes). According to his Swiss patent numbered 123,332, Arx employs cuprous thiocyanate for this purpose. At a considerably earlier date there had been employed, more particularly in conjunction with the use of basic dyestuffs, the mordants commonly used in the dyeing trade, such as tannin, tartar emetic (antimony compound), and the like. Tannin has already been employed as a precipitant by Dr. Traube in the Uvachrome process, but the lac compounds obtained in this manner are not perfectly insoluble. Even but slight solubility, however, gives rise to lack of definition in the finished pictures. Moreover, these tannin lacs are not fast to light.

Recently substances have been found which are capable of forming dye lacs which are not only absolutely insoluble but also faster to light than those hitherto obtainable. These substances are the complex acids, such as phosphotungstic acid, antimonotungstic acid, silicotungstic acid, and the like, which are likewise already extensively used in dye works. They are described in the German patents numbered 286,467, 289,878, and 403,002, and also in the "Enzyklopädie der technischen Chemie" by Prof. Dr. F. Ullmann, Vol. V.

To a certain extent, however, these complex acids also possess the inconvenient property of breaking up hydrolytically, with the evolution of cleavage products of a dark and generally blueish color. Moreover the prints produced on carriers of which the gelatine layer contains substances of this description become rapidly darker in the finished state. Thus for example a gelatine layer prepared with phosphotungstic acid soon becomes blue when exposed to the air, and consequently the picture printed thereon also becomes muddled in its colours, and the colourless portions become toned.

On the other hand, a carrier the layer of which is treated with the addition of mordants such as for example cuprous iodide have the disadvantage that the basic dyestuff is not precipitated in the form of lac on printing. The definition of the picture consequently suffers, and the already applied dyestuff sinks very readily to a lower level at the next printing operation. Moreover, these metallic mordants turn brown in the presence of the slightest traces of hydrogen sulphide, with the formation of black copper sulphide.

Certain organic acids likewise possess great precipitating power for basic dyes, without exhibiting the above-mentioned drawbacks when employed for the production of colored prints. This is more particularly true of β (beta)-oxynaphtholic acid, which, when introduced into the gelatine layer of an image carrier, precipitates the applied dye base in the form of lac, in precisely the same manner as the above-mentioned lac-formers, without subsequently forming colored cleavage products, and without giving rise to subsequent darkening of the picture. The same behaviour is also exhibited by the homologues of this acid, derivatives of naphthylamine and of naphthol.

The difficulty in the way of introducing these substances into a gelatine solution, however, consists in the fact that all these substances precipitate not only basic dyestuffs in an insoluble form, but likewise also gelatine, albumen, rubber, and the like.

If there be added to a gelatine solution a solution of one of the precipitants named above, the same becomes at once precipitated in the form of a pasty insoluble mass.

A way has now been found, with the aid of certain neutral salts such as for example ammonium acetate, of bringing complex acids and gelatine into solution in a single working phase.

To the gelatine solution embodying an addition of ammonia there is added the solution of one of these complex acids, such as for example silicotungstic acid. In this case precipitation of the gelatine no longer takes place. There is then added to this solution acetic acid in such quantity as is sufficient to combine the ammonia in the form of ammonium acetate.

This method has the further great advantage that a gelatine solution thus prepared is at once ready for pouring, that is to say without any tedious congealing and washing process, and absorbs the coloring matter rapidly and in large quantities.

It has moreover not proved possible hitherto to find a pre-treatment for the printing matrices (washing out reliefs) made from cellulose, which does not color at all with the employment of basic dyestuffs, and which does not part with the bulk of the coloring matter absorbed to the gelatine layer of the carrier furnished with precipitants. This slight quantity of coloring matter absorbed by the preliminary treatment is likewise brought during printing on to the gelatine layer of the image carrier, and intensifies the smudging effect of the bleeding out dye.

If, however, the hardened gelatine layer of a carrier in which the precipitants, for example $\beta$ (beta)-oxynaphthoic acid, are present be coated with a top layer, for example of non-hardened, soft gelatine to which, if desired, a very slight quantity of these precipitants can also be added, the coloring matter derived from the bleeding and from the tinting of the matter used for the preliminary treatment of the matrix is absorbed by this top layer. If, after the finishing of the picture, this top layer be removed, it will be clear without further explanation that the coloring matter absorbed by it is also rendered of no effect on the image.

Since this top layer must be so readily removable that for example a bathing of the picture in warm water or gentle rubbing of the same with a pad of cotton-wool suffices therefor, there must be used for the same materials which do not homogeneously combine with the gelatine layer of the carrier, or substances will be added thereto which prevent such combining (for example the addition of ox-gall to the soft gelatine of the top layer) and cause ready detachability (for example additions of gum arabic, dextrine, sugar, and the like).

We claim:

1. A method of producing a carrier for imbibition dye prints in which the gelatine layer is provided with precipitants for the dyestuffs, consisting in introducing ammonia into a solution of gelatine, adding a dye mordant in the form of a complex acid thereto, adding acetic acid in amount sufficient to react with the ammonia to form ammonium acetate, and utilizing the resultant solution for making a carrier film.

2. A method as defined in claim 1, in which the $\beta$ (beta) oxynaphthoic acid is the complex acid employed.

RICHARD GSCHÖPF.
KARL POKORNY.